Sept. 4, 1951  H. J. JOHNSON  2,566,570
HIGH-PRESSURE LIQUID LEVEL GAUGE
Filed Nov. 21, 1949
FIG.I.
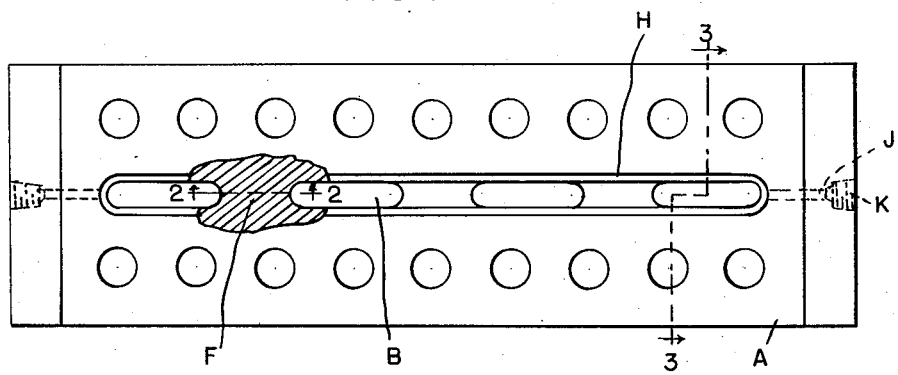
FIG.2.
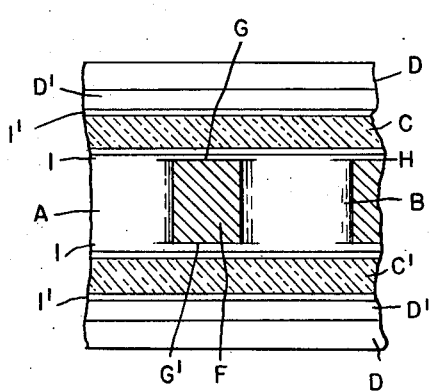
FIG.3.
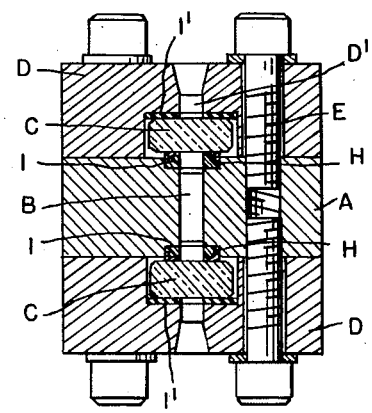
*INVENTOR.*
H. JAMES JOHNSON
BY
ATTORNEYS Patented Sept. 4, 1951

2,566,570

UNITED STATES PATENT OFFICE 2,566,570

HIGH-PRESSURE LIQUID LEVEL GAUGE

Horace James Johnson, Grosse Pointe, Mich., assignor to Penberthy Injector Company, Detroit, Mich., a corporation of Delaware Application November 21, 1949, Serial No. 128,661

3 Claims. (Cl. 73—330)

The invention relates to liquid level gauges of that type adapted for use where the liquid is subjected to excessively high pressures. For such uses the ordinary type of liquid level gauge, such as used with steam boilers, will not withstand such high pressures. This is particularly the case where the gauge is provided with a long vertical slot in a metallic casing adjacent to the transparent panel through which the liquid level is inspected. It is, however, desirable to provide a vertical dimension which is equal to the maximum fluctuation of liquid levels within the container.

It is the object of the instant invention to retain the vertical visibility length and at the same time to obtain a construction which is sufficiently strong.

To this end the invention consists in the construction as hereinafter set forth.

In the drawings:

Fig. 1 is a front elevation of the gauge partly in section;

Fig. 2 is a vertical central section through one of the tie connections on line 2—2, Fig. 1; and Fig. 3 is a cross section on line 3—3, Fig. 1.

A is a plate or bar forming the metallic casing or body of the gauge, and which is provided with a vertical slot B of sufficient length to include all fluctuations in level of liquid therein. Adjacent to the body A on one or both sides thereof are transparent panels C, which are secured by suitable means such as cap members D and bolts E. If the slot B was continuous throughout its entire length, it would weaken the structure and would necessitate very heavy side portions to withstand the internal pressure. On the other hand, if the slot is not continuous it interferes with the indication of all levels. I have therefore devised a construction in which the slot is continuous adjacent to the transparent panels, but is provided with tie connections between the opposite sides of the structure, which are less in thickness than the plate. Thus, as shown, these tie connections F, which are preferably integral with the sides of the member A, are restricted in thickness so as to leave shallow channels G and G' in front and rear thereof which connect the portions of the slot above and below the same. The member A is formed with recesses H completely surrounding the slot B for receiving a sealing gasket I. The transparent panel is clamped against this gasket by the cap member D. This cap member has a slot D' therein registering with the slot B and through which the liquid level is observed. A second gasket I' is placed between the cap and the transparent panel to surround the slot D'.

With the construction as described, the tie members F greatly strengthen the metallic body and do not interfere in any way with the indication of the liquid levels. Thus if the level should happen to be opposite one of the tie members, it could still be indicated in the channel G or G', and these channels also provide for the rise or fall of liquid within the slot B.

The liquid connections between the gauge and the container for the high pressure liquid are formed by small bores J at opposite ends of the plate A. These bores connect the slot with threaded sockets K with which the conduit sections (not shown) are connected.

What I claim as my invention is:

1. In a high pressure liquid level gauge, a casing having a vertical slot in an outer face thereof, a transparent panel secured and sealed to said outer face of the casing to cover said slot, and a tie connection between the portions of said casing on opposite sides of said slot intermediate the ends thereof, spaced from said transparent panel to leave a liquid channel therebetween forming a portion of said slot connecting the portions above and below said tie connection.

2. In a high pressure liquid level gauge, a casing formed of a bar having a plurality of aligned slots therein below a face thereof with a tie connection between the portions of said bar on opposite sides of said slot, located between ends of adjacent slots and spaced from said face, and a transparent panel secured and sealed to the said face of the bar forming a continuous liquid channel connecting the slots on opposite ends of said tie connection.

3. In a high pressure liquid level gauge, a casing formed of a bar having a plurality of aligned slots extending therethrough between front and rear faces thereof leaving a tie connection between ends of adjacent slots, said tie connection being less in thickness than said bar to leave channels connecting the slots adjacent to said front and rear faces, and transparent panels secured and sealed respectively to said front and rear faces of the bar.

H. JAMES JOHNSON.

REFERENCES CITED

The following references are of record in the file of this patent:

UNITED STATES PATENTS

| Number | Name | Date |
| --- | --- | --- |
| 2,510,729 | Van Ham | June 6, 1950 |